United States Patent
Willoughby

Patent Number: 5,345,856
Date of Patent: Sep. 13, 1994

[54] VALVE POSITIONER HAVING ADJUSTABLE GAIN

[75] Inventor: Christopher H. Willoughby, Cincinnati, Ohio

[73] Assignee: Automax, Inc., Cincinnati, Ohio

[21] Appl. No.: 25,173

[22] Filed: Mar. 2, 1993

[51] Int. Cl.$^5$ ............................................. F15B 13/16
[52] U.S. Cl. ........................................ 91/386; 91/387
[58] Field of Search ................. 91/465, 358 R, 363 R, 91/385, 386, 387

[56] References Cited

U.S. PATENT DOCUMENTS

| | | |
|---|---|---|
| 2,358,186 | 9/1944 | Pond . |
| 2,382,941 | 8/1948 | Moore . |
| 2,500,407 | 3/1950 | Segerstad . |
| 2,536,198 | 1/1951 | Matner et al. . |
| 2,588,988 | 3/1952 | Robins . |
| 2,601,511 | 6/1952 | Gaffney . |
| 2,679,829 | 6/1954 | Gorrie et al. . |
| 2,811,138 | 10/1957 | Clements . |
| 2,827,020 | 3/1958 | Cook ........................ 91/387 |
| 2,887,998 | 5/1959 | Thorner . |
| 2,911,953 | 11/1959 | Killian . |
| 3,040,714 | 6/1962 | Taiclet ...................... 91/386 |
| 3,145,722 | 6/1964 | Mueller . |
| 3,209,656 | 10/1965 | Thieme . |
| 3,511,134 | 5/1970 | Wittren ..................... 91/387 |
| 3,915,062 | 10/1975 | Westfall et al. .......... 91/387 X |
| 3,971,295 | 7/1976 | Nash . |
| 4,206,686 | 6/1980 | Gonzalez et al. . |
| 4,545,560 | 10/1985 | Marcadet et al. . |
| 4,862,788 | 9/1989 | Baumann . |
| 5,179,888 | 1/1993 | Schendel et al. ............. 91/387 |

OTHER PUBLICATIONS

Brochure, "Positioners Pneumatic & Electro-Pneumatic", Accord Controls, Inc., 11444 Deerfield Road, Cincinnati, Ohio 45242, 12 pages Jan. 1992.

*Primary Examiner*—Edward K. Look
*Assistant Examiner*—Hoang Nguyen
*Attorney, Agent, or Firm*—Wood, Herron & Evans

[57] ABSTRACT

A valve positioner has a pneumatic transducer responsive to a signal pressure for displacing a spool valve away from a neutral position to effect actuation of an actuator output shaft and further includes a gain adjustment apparatus. The pneumatic transducer includes a balance beam being operably connected at one end to the spool valve and at the other end to a hinge spring. A clamp mechanism is attached to the hinge spring and is slidably adjustable along the length of the hinge spring to vary the spring characteristics. The hinge spring tapers in thickness such that the spring increases in thickness in a direction from a first end of the spring towards the balance beam. A window or cut-out is also provided in the hinge spring to further assist in varying the spring characteristics as the clamp mechanism is moved along the hinge spring, and provide a wide range of gain adjustment over the single spring.

16 Claims, 2 Drawing Sheets

VALVE POSITIONER HAVING ADJUSTABLE GAIN

BACKGROUND OF THE INVENTION

The present invention relates to the field of valve positioners and more particularly to a gain adjustment mechanism for a valve positioner.

Valve positioners employing a feedback system operating on so-called "force-balance" principles have been in existence for years. Such valve positioners may be used to control the flow rate through a system valve according to a control signal sent to the positioner and a feedback response received from the valve actuator. The present invention specifically relates to valve positioners of the type having a pilot valve such as a spool valve and a feedback mechanism including a balance beam hingedly secured at one end to the valve positioner and operable at the other end to shift the position of the spool valve.

Such valve positioners, for example, may be designed for use with a control system including a flow sensor for sending flow rate information to a controller which compares the actual flow rate in the system to the desired flow rate through the system valve. Based on the signal received from the flow sensor, the controller generates a control signal which is converted to a relatively small signal pressure sent to the valve positioner. The valve positioner then causes the flow rate through the valve to change by a specific value which is a function of the signal pressure. The valve positioner further includes a feedback system which constantly operates to return the spool valve to a null position in which the valve positioner acts to maintain a constant flow rate through the system valve until the signal pressure again causes the valve positioner to move the system valve in an open or close direction.

As mentioned above, the present invention is generally directed to valve positioners employing a feedback system operating on force-balance principles. Specifically, the positioner employs a balance beam pivoted at one end and captured between a diaphragm and a compression feedback spring so that its other end operates the spool of a pilot valve, for example. The diaphragm receives the signal pressure to move the balance beam and thus shift the spool valve to supply pressure to the valve actuator thereby changing the flow rate through the system valve. The compression feedback spring operates in response to the movement of the valve actuator shaft to force the balance beam in the opposite direction to balance the signal pressure force. This shifts the spool of the spool valve in the same direction so as to stop the flow of supply air to the actuator and maintain the system valve flow rate.

Often, the balance beam in these valve positioners is secured at one end to the positioner housing by a hinge spring. The stiffness of the hinge spring determines the responsiveness of the balance beam to the signal pressure and therefore affects spool valve shift and flow area for a given change in signal pressure to the diaphragm. In other words, along with the orifice size of the spool valve, the stiffness of the hinge spring determines the sensitivity or "gain" of the valve positioner. When matching a particular valve positioner to a valve actuator, the gain of the positioner is an important consideration. For example, small volume actuators require lower gains to prevent overshoot and oscillation by the actuator and large volume actuators require relatively higher gains to increase the sensitivity and operating speed of the actuator.

Two illustrative examples of valve positioners utilizing balance beams secured to the positioner by a hinge spring are found in U.S. Pat. No. 2,588,988 to Robins and U.S. Pat. No. 2,679,829 to Gorrie et al. The patents to Robins and Gorrie et al. each disclose a valve positioner operating on force-balance principles and including a balance beam hingedly connected at one end to the positioner housing by a leaf or hinge spring. The balance beam is connected to a pilot valve at the other end and is operated through a control pressure sent to a bellows located intermediate the hinge spring and the pilot valve.

Both Robins and Gorrie et al. fail to provide a manner of adjusting the gain of the positioner. Although it is possible and it has been known to change the hinge spring to a thinner or thicker hinge spring in order to vary positioner sensitivity or "gain", this practice is difficult and time consuming. In this regard, to enable a wide range of gain adjustability, a large number of hinge springs of differing thickness would have to be stocked and then fastened in place, one by one, until the desired gain is achieved.

In this regard, certain fluid systems such as those employing relatively large valve actuators require valve positioners having a higher "gain" or sensitivity. That is, for a given signal pressure the balance beam must move the pilot valve of the positioner a relatively large amount. This translates into utilizing a relatively thin or flexible hinge spring which will allow the balance beam to move a greater amount per unit of signal pressure than would a thicker, more rigid hinge spring. Conversely, a relatively thick or rigid hinge spring would be necessary in valve positioners employed in a fluid system requiring low sensitivity or "gain" such as a system employing relatively low volume valve actuators. A thicker, more rigid hinge spring allows the balance beam to move less per unit of signal pressure and therefore causes the pilot valve to be less sensitive to changes in signal pressure.

As previously mentioned, in order to cause a change in the sensitivity or "gain" of past valve positioners it has been necessary to change the hinge spring to a hinge spring having a different stiffness, e.g., to a spring having a different thickness. Any given hinge spring, as used in the past, has produced a single given sensitivity or "gain" in the positioner. Therefore, to allow a range of sensitivities or "gains" a number of hinge springs of differing stiffnesses were required and the variability of sensitivities or "gains" within that range directly corresponded to the number of different hinge springs on hand.

Accordingly, it has been one objective of the present invention to provide a valve positioner having an inexpensive adjustable gain mechanism which allows the valve positioner to be matched to a particular valve actuator without having to stock and interchange parts of the positioner.

Another object of the invention has been to provide infinite adjustment of positioner gain over a wide range of gains while utilizing a single given hinge spring.

SUMMARY OF THE INVENTION

To these ends, a preferred embodiment of the present invention includes a valve positioner operating on force-balance principles through a design which incorporates a diaphragm receiving a signal pressure and acting against a balance beam. Together, the diaphragm and the balance beam may be referred to as a transducer means for translating the signal pressure into a force for shifting a pilot valve such as a spool valve within the positioner. The balance beam is secured to the valve positioner housing at one end by a hinge spring and a clamping unit which is slidably adjustable along the length of the hinge spring to change the effective stiffness of the hinge spring. The other end of the balance beam operates the spool of a spool valve to control pressure sent to the valve actuator which in turn controls the flow rate through the valve being positioned, i.e., the "system valve". A feedback system is further provided through a cam and cam follower arrangement mounted within the positioner and operably connected to a compression feedback spring which acts on the side of the balance beam opposite the diaphragm to maintain the balance beam in a null position.

The valve positioner operates with a single diaphragm which receives a small signal pressure, e.g., in the range of 3–15 psi, from a control pressure port in the valve positioner housing. The control pressure port is connected to a source of pressure regulated by a controller which receives flow rate information from a flow sensor connected downstream of the system valve. The controller compares the flow rate value received from the flow sensor to the stored or desired value and sends the appropriate signal pressure to the diaphragm.

The diaphragm acts against one side of the balance beam and is located intermediate the two ends of the balance beam. The balance beam takes the form of a cantilever which is connected to the valve positioner housing at one end by the hinge spring and has an opposite free end which operates the spool of a spool valve. The spool valve includes output ports supplying, for example, pneumatic pressure to a valve actuator. For a given amount of signal pressure, the diaphragm will be displaced by a specific distance and will thus displace the balance beam and the spool of the spool valve by a corresponding distance. Thus, the spool valve will move the valve actuator to open the system valve and increase the flow rate through the system valve by an amount which is a function of the signal pressure.

Although easily adaptable for use with linear valve actuators, the preferred embodiment of the valve positioner includes a cam and cam shaft which is connected to the shaft of a rotary valve actuator. A cam follower connected to the end of a span arm pivotally connected inside the valve positioner housing rides along the surface of the cam. The span arm is operably connected to one end of a zero arm by a fulcrum member and span adjustment mechanism. The zero arm is also pivotally connected to the valve positioner housing at a midpoint thereof and connected at the opposite end to a compression feedback spring. The compression feedback spring is mounted within the housing to extend between the zero arm and the balance beam at a position directly opposed to the diaphragm. As the actuator shaft rotates in response to pressure received from the spool valve of the positioner, the cam will likewise rotate and, through the span and zero arms, cause a force to be applied to the balance beam in opposition to the force of the diaphragm so as to return the balance beam to a null position.

One advantage of the design of the span arm, span adjustment mechanism and zero arm of the present invention is that when the cam of the positioner, and therefore the system valve, is in a closed position the span adjustment mechanism may be moved without affecting the zero adjustment. That is, the span may be adjusted without affecting the compression of the feedback spring. This eliminates the trial and error approach of past positioners which require repeated adjustment of both the span and zero characteristics of the positioner since adjustment of one necessarily changed the setting of the other.

The response of the balance beam to a given signal pressure, i.e., the gain of the valve positioner, is a partly a function of the effective stiffness or spring rate of the hinge spring. In the preferred embodiment of the invention a first end of the hinge spring is secured to a first end of the balance beam while the second end of the hinge spring is secured to the valve positioner housing. A clamping unit is slidably adjustable along the hinge spring to vary the effective length of the hinge spring and thereby vary its stiffness. Through this preferred design, the effective stiffness of the hinge spring will increase as the clamping unit is moved toward the first end of the balance beam. Likewise, the effective spring stiffness will decrease as the clamping unit is moved away from the first end of the balance beam.

To further assist in varying the effective stiffness or spring rate of the hinge spring, the hinge spring preferably tapers in thickness such that the spring thickness increases in a direction from the end of the hinge spring which is secured to the housing of the positioner to the balance beam. The tapering thickness of the hinge spring allows the effective stiffness of the spring to be varied over a wide range. Since the hinge spring is thicker, i.e., has more spring mass, at the end of the hinge spring adjacent the balance beam, the effective stiffness of the hinge spring will be greatest at this end of the spring. The effective stiffness of the spring decreases at a greater rate than would a spring of constant thickness as the clamp unit is moved away from the balance beam. Thus, the range of effective stiffnesses for the hinge spring will be much wider than the range of effective stiffnesses of a hinge spring having a constant thickness.

In another aspect of the invention, the hinge spring also includes a cut-out or "window" which is wider near its connection to the housing and narrower near its connection to the balance beam. In the preferred embodiment the cut-out or window is triangular in shape with an apex of the triangle directed towards the balance beam. As a result of the cut-out or window, the rate of change in spring mass from the thin end to the thick end of the hinge spring is increased over the same hinge spring without the window. This design allows the effective stiffness of the hinge spring to be more widely varied over the adjustment range and is a further manner of widening the adjustment range of the effective stiffness of the spring.

Further objects and advantages will become apparent to those of ordinary skill in the art from the following detailed description taken in conjunction with the accompanying drawings.

GENERAL ORGANIZATION

Figure 1:
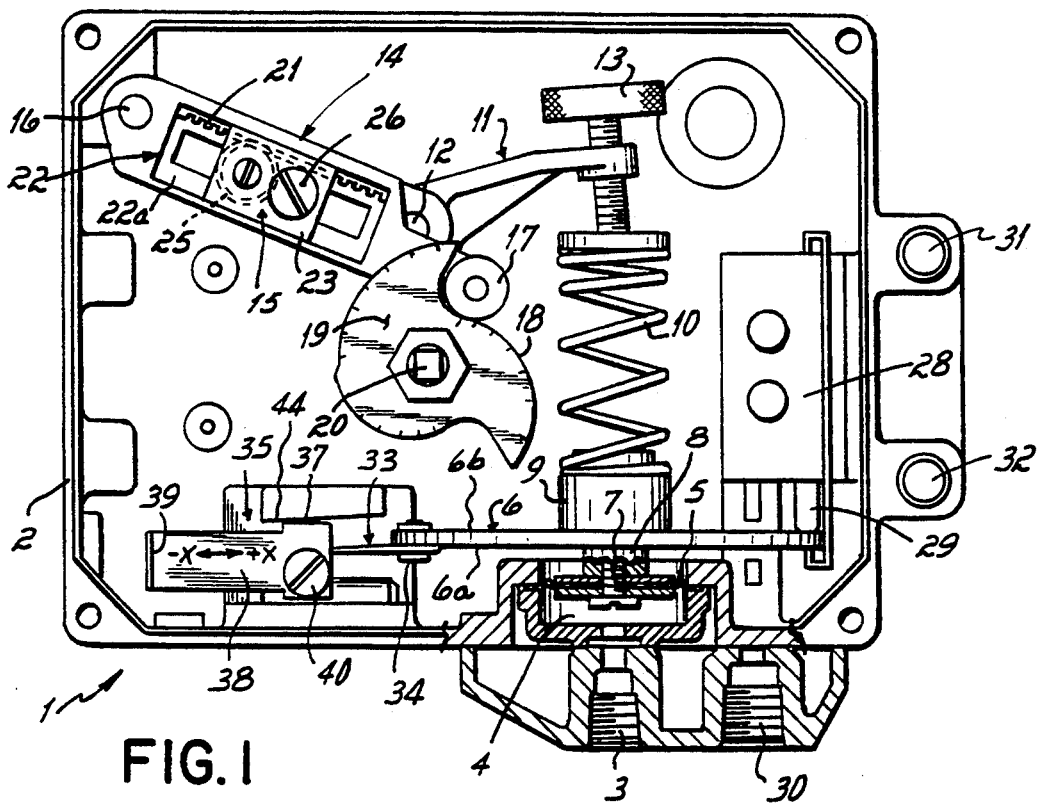
FIG. 1 is a top partial cross sectional view of a valve positioner of the invention showing the cam in a full clockwise or "closed" position corresponding to a closed system valve.
Figure 1A:
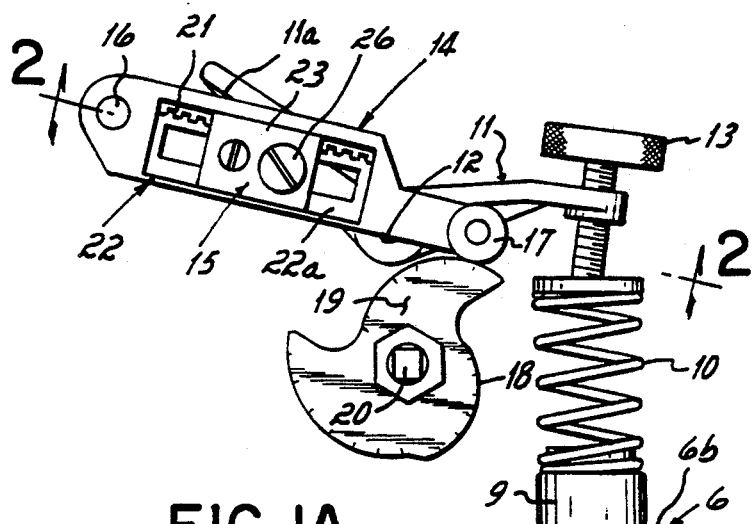
FIG. 1A is a top view of the moving parts of the valve positioner of FIG. 1 showing the cam in a full counter-clockwise or "open" position corresponding to an open system valve.

Turning first to FIG. 1, a preferred embodiment of the present invention includes a valve positioner I having a housing 2 for enclosing all of the major components of the valve positioner 1. The valve positioner housing 2 includes a signal pressure input port 3 for receiving a signal pressure such as pneumatic or hydraulic pressure from a controller (not shown). The signal pressure port 3 leads to a space 4 covered by a diaphragm 5 which moves according to the force supplied by the signal pressure entering the port 3. The diaphragm 5 is rigidly secured to the bottom surface 6a of a balance beam 6 by a screw fastener 7 and a spacer 8. On the top surface 6b of the balance beam 6 and directly opposed to the diaphragm 5, a mounting pedestal 9 is secured to the balance beam 6, preferably by screw 7, and receives the lower end of a compression feedback spring 10. A zero arm 11 is pivotally mounted to the valve positioner housing 2 at a pivot 12 and is secured at one end to the compression feedback spring 10 by a zero adjust knob 13 threaded through the zero arm 11. The pivot 12 of the zero arm 11 is located approximately at a midpoint on the zero arm 11 such that the two ends of the zero arm 11 may pivot back and forth in opposite directions.

The end of the zero arm 11 opposite the zero adjust knob 13 is operatively connected to a span arm 14 having a span adjustment mechanism 15. The span arm 14 is pivotally connected to the valve positioner housing 2 at one end by a pivot 16 and has a cam follower 17 mounted at its opposite end. In response to rotation of a cam 19, the cam follower 17 rides along the cam surface 18 of the cam 19 which is secured to cam shaft 20 coupled to and rotated by the actuator shaft of a rotatory valve actuator (not shown).

Figure 2:
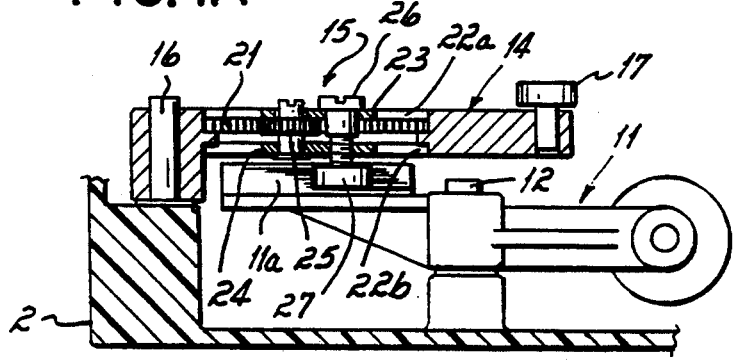
FIG. 2 is a cross sectional view taken along line 2—2 of FIG. 1A.

As best shown in FIG. 2, the span adjustment mechanism 15 includes a rack 21 located along the upper edge of a cut-out 22 in the span arm 15. The cut-out 22 includes two outer recessed portions 22a, 22b which receive two respective sliding plates 23, 24. The two sliding plates 23, 24 are connected by a pinion 25 and a lock screw 26. A roller or fulcrum member 27 is attached to the end of the lock screw 26 and bears against the underside of the zero arm 11. The pinion 25 engages the rack 21 such that rotation thereof will move the two sliding plates 23, 24 along the length of the cut-out 22 and cause the roller or fulcrum member 27 to move along the bottom surface 11a of the zero arm 11. It will also be appreciated that rotation of the cam 19 will cause the span arm 14 to pivot at 16 and cause the fulcrum member 27 to rotate the zero arm 11 about its pivot 12 and thereby compress the feedback spring 10. When the valve positioner is in a "closed" position as shown in FIG. 1, the portion of the zero arm 11 along which the fulcrum member rides is parallel to the span arm 14 and particularly the cut-out 22 in which the span adjustment mechanism rides. Thus, in this position adjustment of the span will not affect the zero adjustment (that is, it will not affect the compression of the feedback spring 10) since movement of the fulcrum member 27 (FIG. 2) will not pivot the zero arm 11.

As further shown in FIG. 1, the balance beam 6 operates a spool valve 28 through engagement of the spool 29 with the top surface 6b of the balance beam 6. The spool valve 28 further includes an input port 30 and two output or gauge ports 31, 32 which may be connected to the rotary valve actuator (not shown).

Figures 3, 4:
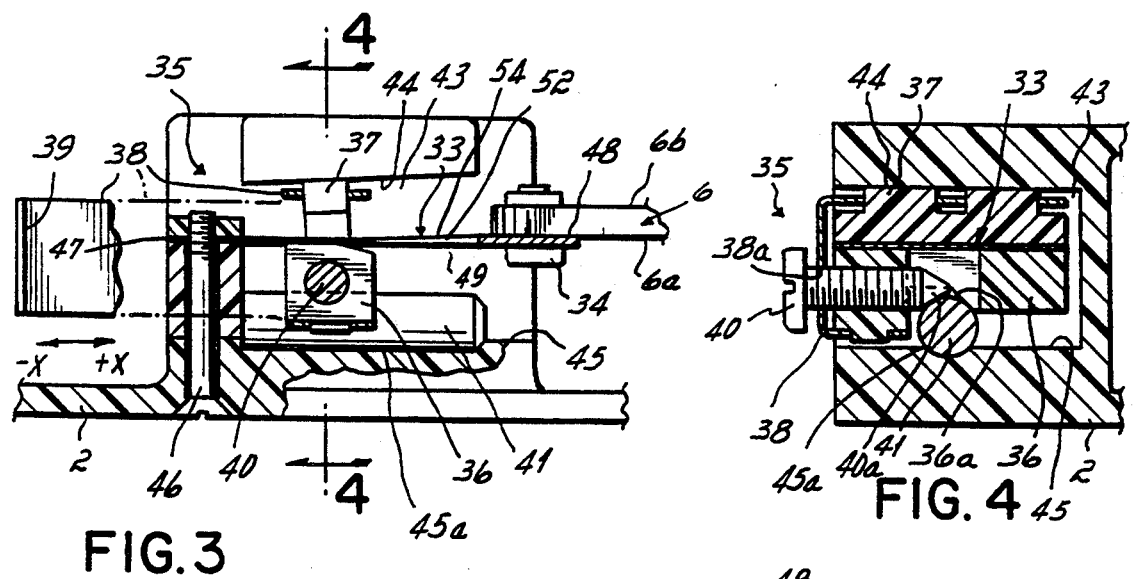
FIG. 3 is an elevational view in partial cross section of the gain adjustment mechanism of the present invention.
FIG. 4 is a cross sectional view taken along line 4—4 of FIG. 3.

A hinge spring 33 is rigidly secured to the end of the balance beam 6 opposite the spool valve 28. The hinge spring 33 is preferably secured by fasteners such as screw fasteners 34 (only one of which is shown in FIG. 1) to the bottom surface 6a of the balance beam 6. The hinge spring 33 is also secured at its opposite end to the valve positioner housing 2 by screws 46 (FIG. 3). A gain adjustment mechanism 35 is further provided for varying the effective stiffness of the hinge spring 33.

The Gain Adjustment Mechanism

As shown in FIGS. 3 and 4, the gain adjustment mechanism 35 includes a clamp member 36 and a spacer member 37 held together on opposite sides of the hinge spring 33 by a clip 38. The clip 38 includes a handle portion 39 for allowing the gain adjustment mechanism 35, including the clamp member 36 and spacer member 37, to be moved along the length of the hinge spring 33. A lock screw 40 and a pin 41 are provided to clamp the entire gain adjustment mechanism firmly into place within a space 43 in the housing 2 as well as to clamp the hinge spring 33 between the clamp member 36 and spacer member 37.

As mentioned above, the gain adjustment mechanism 35 is received within a space 43 which is defined between walls 44 and 45 within the positioner housing 2. One wall 44 is preferably sloped so as to be essentially parallel to the top sloping surface 54 of the tapered region 49 of the hinge spring 33. This allows the spacer member to easily move back and forth between the wall 44 and the hinge spring 33 during gain adjustment, The pin 41 is partially received in a groove 45a in the other wall 45. The clamp member 36 includes a notch 36a which allows the clamp member 36, and thus the entire clamping unit comprised of the clamp member 36, spacer member 37 and clip 38, to slide along an upper surface of the pin 41. The lock screw 40 extends through an aperture 38a in the clip 38 and a threaded hole 36b in the clamp member 36 such that the tip 40a of the lock screw 40 engages the upper surface of the pin 41 to lock the entire clamping unit in place within the space 43 and at a desired location along the length of the hinge spring 33.

As will be appreciated from FIG. 3, sliding movement of the clamping unit, i.e., the clamping member 36, spacer member 37 and the clip 38, in a +x direction will cause the effective length of the hinge spring 33 to be decreased and thus increase the effective stiffness of the hinge spring 33. Likewise, when the clamping unit is moved in a −x direction, the effective length of the hinge spring 33 will be increased and the effective stiffness of the hinge spring 33 will be decreased.

Figure 5:
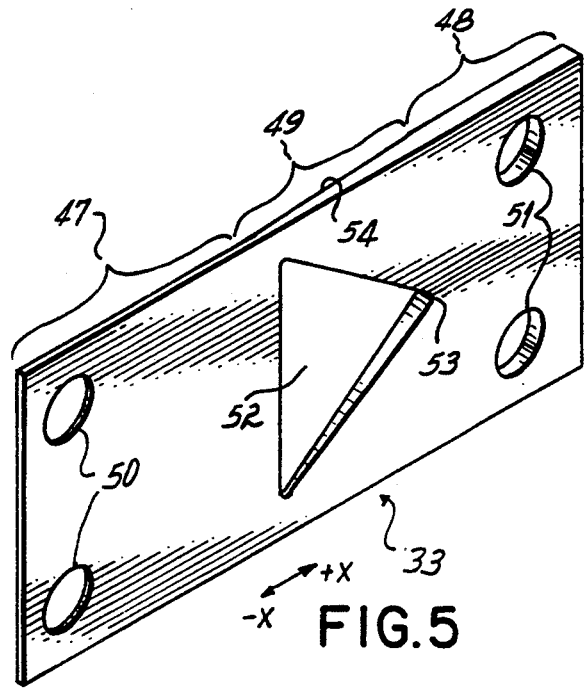
FIG. 5 is a perspective view of the hinge spring used in conjunction with the gain adjustment mechanism of the present invention.

Turning now to FIG. 5, the hinge spring 33 includes a thin end 47 and a thick end 48. In one preferred embodiment the thin end 47 is approximately 0.010 inches in thickness and the thick end 48 is approximately 0.050 inches in thickness. A tapered region 49 extends between the thin end 47 and the thick end 48 of the hinge spring 33. The hinge spring 33 also preferably includes a pair of apertures 50 in the thin end 47 for receiving the screw fasteners 46 which fasten the hinge spring 33 to the valve positioner housing 2 and a pair of apertures 51 in the thick end 48 for receiving the screws 34 which fasten the hinge spring 33 to the balance beam 6, as shown in FIG. 3.

The hinge spring 33 further includes a window or cut-out 52 which decreases in width along the length of the hinge spring 33 in a direction from the thin end 47 to the thick end 48 of the hinge spring 33. Preferably, the window or cut-out 52 is triangular in shape and has an apex 53 which is directed towards the thick end 48 of the hinge spring 33.

It will thus be appreciated that as the clamp member 36, spacer member 37 and clip 38 are moved in the +x direction, as shown in FIG. 3, the effective length of the hinge spring 33 will not only be reduced but the effective mass of the hinged spring will be increased, thus further increasing the stiffness of the hinge spring 33. That is, as the clamping unit is moved in the +x direction, the mass of the hinge spring 33 across its width at the point where it passes between the clamp member 36 and the spacer member 37, i.e., its bending point, will be greater and therefore effectively produce a greater stiffness in the hinge spring 33. It will be appreciated that the effective stiffness of the hinge spring 33 will be greatest at the point along the hinge spring 33 where the clamp member 36 and spacer member 37 have moved past the apex 53 of the window 52 in the hinge spring 33. It is at this point on the hinge spring 33 that the hinge spring 33 will have its smallest effective length and its greatest effective mass across the width of the hinge spring 33 at its bending point.

This design causes the hinge spring 33 to have a very low stiffness when the clamp member 36 and spacer member 37 are located at the thin end 47 of the hinge spring 33, and a very high effective stiffness when the clamp 36 and spacer 37 are located at the thick end 48 of the hinge spring 33. The combined effect of the slidably mounted clamp member 36 and spacer member 37 and the tapered thickness and window of the hinge spring 33 cause the hinge spring 33 to have a wide range of effective stiffnesses and to be infinitely variable within that range of effective stiffnesses.

Operation of the Gain Adjustment Mechanism

Referring particularly to FIGS. 3 and 4, the gain adjustment mechanism 35 is used to adjust the effective stiffness or spring rate of the hinge spring 33 in the following manner.

First, the lock screw 40 is loosened such that its tip 40a is retracted at least partially out of the notch 36a in the clamp 36. In this manner, the lock screw is backed off enough to allow the clamp member 36 and spacer member 37 to release their grip on the hinge spring 33 and to also allow the clamp member 36 to slide along the top surface of the pin 41. The top surface of the spacer member 37 slides along the sloped wall 44 as the bottom surface follows the sloping top surface 54 of the tapered region 49 of the hinge spring 33. To move the clamp member 36 and spacer member 37 to the desired location along the length of the hinge spring 33, the operator uses the handle portion 39 of the clip 38.

The required gain will be a function of the desired actuator speed and sensitivity, and will further be a function of the size or volume of the actuator being used with the valve positioner 1. For example, small volume actuators will require lower gains to prevent valve actuator overshoot and oscillation and therefore the clamp member 36 and spacer member 37 will be moved farther in the +x direction so as to make the effective stiffness of the hinge spring 33 greater than would be required when using larger volume valve actuators. Large volume actuators require higher gains than lower volume actuators to increase the actuator sensitivity and operating speed.

When the clamp member 36 and spacer member 37 have been adjusted to the desired location along the length of the hinge spring 33, the locking screw 40 is tightened into the notch 36a in the clamp member 36 and against the top surface of the pin 41. This causes the clamp member 36 to exert upward force on both the hinge spring 33 and the spacer member 37 to thus force the spacer member 37 against the inner sloped wall 44 of the valve positioner housing 2. At the same time, the pin 41 is forced down into the groove 45a in the bottom inner wall 45 of the valve positioner housing 2. Thus, by locking the screw 40 into place, the clamp member 36 and spacer member 37 are not only clamped against the hinge spring 33 but are also locked into place between walls 44 and 45 of the valve positioner housing 2.

Accordingly, the present invention allows a particular valve positioner to be quickly and easily matched with a wide range of different valve actuators. Also, the positioner gain may be quickly adjusted to particular valves within a wide range of gains to vary the speed and sensitivity of the valve actuator according to the specific needs of the fluid system. Finally, system downtime and expenses are reduced because of the quick, efficient manner provided by the invention to change the effective stiffness of the hinge spring and thereby vary the positioner gain.

Although a preferred embodiment of the invention has been described above, certain modifications will become readily apparent to those of ordinary skill in the art without departing from the scope of the invention. For example, the clamping unit of the gain adjustment mechanism may be substituted with other obvious designs including, for example, spring-loaded clamps on either side of the hinge spring and a rack and pinion assembly for moving the clamps along the length of the hinge spring.

Other modifications will become readily apparent to those of ordinary skill in the art without departing from the scope of the invention, and applicant intends to be bound only by the claims appended hereto.

I claim:

1. Valve positioner apparatus comprising:
   a pilot valve;
   a balance beam operatively connected to a hinge spring at one end and to said pilot valve at another end thereof, said hinge spring having a stiffness and including a first end and a second end;
   a feedback spring mounted within said positioner and providing balancing force to said balance beam;
   a span adjustment mechanism for varying the balancing force provided by said feedback spring; and,
   a gain adjustment mechanism independent from said span adjustment mechanism and mounted to said hinge spring for movement between said first and second ends for varying the stiffness of said hinge spring.

2. The apparatus of claim 1 wherein said gain adjustment mechanism further comprises a clamp mounted to said hinge spring for movement along said hinge spring to vary the stiffness thereof.

3. The apparatus of claim 2 wherein said hinge spring further comprises a tapered leaf spring which increases in thickness in a direction from said first end to said second end of said hinge spring.

4. The apparatus of claims 2 or 3 wherein said hinge spring further includes an aperture for reducing the stiffness of said hinge spring, said aperture decreasing in width in a direction from said first end to said second end of said hinge spring.

5. The apparatus of claim 4 wherein said aperture comprises a triangularly-shaped window in said hinge spring, said window having an apex directed towards said second end of said hinge spring.

6. Valve positioner apparatus having a feedback mechanism including a feedback spring contained in a housing and a balance beam also contained within said housing and operably connected to a spool valve for supplying fluid to a valve actuator, said valve positioner apparatus having independently operable span and gain adjustment apparatus, said gain adjustment apparatus comprising:
   a hinge spring having a stiffness and including a first end connected to said valve positioner housing and a second end thereof connected to said balance beam; and,
   a gain adjustment mechanism connected to said hinge spring for varying the stiffness of said hinge spring.

7. The apparatus of claim 6 wherein said gain adjustment mechanism further comprises a clamp mounted for movement along said hinge spring for varying an effective length and the stiffness of said hinge spring.

8. The apparatus of claim 7 wherein said hinge spring further comprises a tapered leaf spring which increases in thickness in a direction from said first end to said second end of said hinge spring.

9. The apparatus of claims 7 or 8 wherein said hinge spring further includes an aperture for reducing the stiffness of said hinge spring, said aperture decreasing in width in a direction from said first end to said second end of said hinge spring.

10. The apparatus of claim 9 wherein said aperture comprises a triangularly-shaped window in said hinge spring, said window having an apex directed towards said second end of said hinge spring.

11. In a valve positioner for use with a pneumatic valve actuator having a rotatable output shaft for effecting rotary positioning of a valve, said valve positioner including an elongated axially displaceable spool valve located between said pneumatic valve actuator and a supply of pneumatic pressure for controlling rotary movement of said actuator output shaft, a transducer coupled to said spool valve and responsive to a control signal for effecting axial displacement of said spool valve away from a predetermined neutral position when it is desired to effect rotation of said output shaft, said transducer including a balance beam mounted for movement in response to said control signal and being operably connected at a first end to said spool valve and at a second end to a hinge spring having a stiffness, and a feedback mechanism responsive to rotary movement of said rotatable output shaft, said feedback mechanism including a feedback spring for generating a force in opposition to a force generated in said transducer by said control signal for returning said spool valve to said neutral position when said output shaft has rotated to a desired position, wherein the improvement comprises:
   a gain adjustment mechanism operably connected to said hinge spring for varying the stiffness of said hinge spring.

12. The valve positioner of claim 11 wherein said hinge spring is connected at a first end to a mounting within said valve positioner and at a second end to said balance beam and said gain adjustment means further comprises a clamp mounted for movement along said hinge spring for varying an effective length and the stiffness of said hinge spring.

13. The valve positioner of claim 12 wherein said hinge spring further comprises a tapered leaf spring which increases in thickness in a direction from said first end to said second end of said hinge spring.

14. The valve positioner of claims 12 or 13, wherein said hinge spring further includes an aperture for reducing the stiffness of said hinge spring, said aperture decreasing in width in a direction from said first end to said second end of said hinge spring.

15. The valve positioner of claim 14 wherein said aperture comprises a triangularly-shaped window in said hinge spring, said window having an apex directed towards said second end of said hinge spring.

16. A method of operating a valve positioner of a type including a hinge spring having a stiffness and being secured at a first end to a housing of said valve positioner and at a second end to a balance beam which operates a spool valve of said valve positioner, said positioner including a feedback mechanism including a feedback spring for providing a balancing force to said balance beam, said valve positioner further including a span adjustment mechanism and an independently operable gain adjustment mechanism mounted for movement along said hinge spring, the method comprising the steps of:
   calibrating said positioner at least in part by use of said span adjustment mechanism; and
   moving said gain adjustment mechanism along said hinge spring thereby varying the stiffness of said hinge spring and the gain of said positioner.

* * * * *